United States Patent
Hsieh et al.

(10) Patent No.: US 10,013,044 B2
(45) Date of Patent: Jul. 3, 2018

(54) POWER CONTROL SYSTEM AND RELATED METHOD OF TRANSMITTING POWER MANAGEMENT BUS TO SERVER

(71) Applicant: Wistron Corporation, New Taipei (TW)

(72) Inventors: Cheng-Kuang Hsieh, New Taipei (TW); Hsien-Yu Wang, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 203 days.

(21) Appl. No.: 15/080,596

(22) Filed: Mar. 25, 2016

(65) Prior Publication Data
US 2017/0131756 A1     May 11, 2017

(30) Foreign Application Priority Data

Nov. 10, 2015   (TW) .............................. 104136933 A

(51) Int. Cl.
| | |
|---|---|
| *G06F 1/32* | (2006.01) |
| *G06F 1/18* | (2006.01) |
| *G06F 1/26* | (2006.01) |
| *G06F 13/00* | (2006.01) |

(52) U.S. Cl.
CPC .............. *G06F 1/324* (2013.01); *G06F 1/189* (2013.01); *G06F 1/263* (2013.01); *G06F 1/3206* (2013.01); *G06F 1/266* (2013.01); *G06F 13/00* (2013.01); *Y02D 10/126* (2018.01)

(58) Field of Classification Search
CPC .......... G06F 1/266; G06F 13/00; G06F 1/324; G06F 1/189; G06F 1/263; G06F 1/3206
USPC .................. 713/300, 310, 322; 711/100, 106
See application file for complete search history.

(56) References Cited

U.S. PATENT DOCUMENTS

| | | | | |
|---|---|---|---|---|
| 4,408,353 | A * | 10/1983 | Bowen .............. | H04L 12/40045 358/901.1 |
| 8,051,309 | B2 * | 11/2011 | Kashi ................ | H04W 52/0283 340/12.32 |
| 2011/0077793 | A1 | 3/2011 | Hsieh | |

(Continued)

FOREIGN PATENT DOCUMENTS

| | | |
|---|---|---|
| TW | M311189 | 5/2007 |
| TW | 200801920 | 1/2008 |

(Continued)

OTHER PUBLICATIONS

Office action dated Jul. 12, 2016 for TW application No. 104136933, filed Nov. 10, 2015, p. 2 line 3-26, p. 3, page 4 line 1-22 and line 25-26, p. 5 line 1-11 and line 14-26, p. 6 line 1-25 and p. 7 line 2-15.

*Primary Examiner* — Ji H Bae
(74) *Attorney, Agent, or Firm* — Winston Hsu

(57) ABSTRACT

A power control system includes a power supply unit, first and second microcontrollers, a transmission line and first and second filters, for transmitting a power management bus (PMB) to a server. The power supply unit provides a power signal, the PMB and a carrier frequency. The first and second microcontrollers respectively perform modulation and demodulation to the PMB according to the carrier frequency, such that the transmission line simultaneously transmits the power signal and the PMB to the server.

30 Claims, 9 Drawing Sheets

(56) References Cited

U.S. PATENT DOCUMENTS

| | | | |
|---|---|---|---|
| 2012/0069874 A1* | 3/2012 | Tsai | G06F 1/26 375/219 |
| 2012/0166582 A1* | 6/2012 | Binder | H04L 63/18 709/217 |
| 2014/0006812 A1* | 1/2014 | Mohr | G06F 1/26 713/300 |
| 2016/0269195 A1* | 9/2016 | Coenen | H02J 7/0014 |

FOREIGN PATENT DOCUMENTS

| | | |
|---|---|---|
| TW | 201112674 A1 | 4/2011 |
| TW | M507119 U | 8/2015 |

\* cited by examiner

POWER CONTROL SYSTEM AND RELATED METHOD OF TRANSMITTING POWER MANAGEMENT BUS TO SERVER

BACKGROUND OF THE INVENTION

1. Field of the Invention

The present invention relates to a power control system and related method of transmitting power management bus to server, and more particularly, to a power control system and related method of transmitting power management bus to server by transmitting the power management bus together with power signal in a physical transmission line.

2. Description of the Prior Art

Open compute project (OCP) is an organization that shares hardware designs of large-scale data center, and aims at maximizing operational efficiency of the 1 large-scale data center to simplify system operations, improve system reliability, maintenance, energy efficiency as well as reduce power consumption. The OCP provides open sharing sources of hardware standards of the large-scale data center to facilitate industrial development, expand purchase of open rack, thereby reduce development cost for the large-scale data center.

FIG. 1 illustrates a rearview of an OCP standard open rack 1. OCP defines OpenU (denoted with NxOpenU, where N is an integer) as a unit to describe sizes of elements comprised in the open rack 1, and one OpenU is 48 millimeters. The OCP standard open rack 1 includes a direct-current power input, an alternating-current power input, a top of rack (TOR) switch with 2×OpenU and three power zones with 13×OpenU to form three power control systems. Each power zone includes one 3×OpenUp power shelf and one 10×OpenU equipment bay (or equipment chassis). There are a server and storage cases disposed in the equipment bay. Multiple power supply units (PSUs) are disposed in the power shelf for providing power to drive equipment disposed in the power zone, where multiple power shelves are connected by power bus bars (denoted with slash patterns) to obtain direct-current and alternative-current power supply.

To achieve power management, every power zone requires a power management circuit and related wire configurations to transmit power management bus (PMBUS) to the server, so the server can acquire power supply information associated with the power supply units in the same power shelf.

However, if the server wants to acquire the power supply information associated with the power supply units, the power management circuit provides the power supply information only when being asked by the server. In practice, if the power supply unit encounters errors, the server never is aware of errors as long as the power control system and the server in the same power zone are still working. Therefore, maintenance staff discovers errors associated with the power supply units after the power management has been replaced, which leads to hardware hazards to the server. Further, every time the power supply unit is changed or replaced by a new one, a configuration procedure must be executed between the new power management circuit and server in order to perform power management, which is time wasting and inconvenient for installation and maintenance. Moreover, the power management circuit and related wire configurations make complicated hardware configurations as well as increased cost to the open rack.

Therefore, there is a need to improve the prior art.

SUMMARY OF THE INVENTION

It is therefore an objective of the present invention to provide a power control system and related method of transmitting power management bus to server by transmitting the power management bus together with power signal in a physical transmission line, to solve the abovementioned issues.

The present invention discloses a power control system for transmitting a power management bus (PMB) to a server. The power control system includes a power supply unit, a first microcontroller, a transmission line, a first filter, a second filter, and a second microcontroller. The power supply unit is used for outputting a power signal, a PMB and a carrier frequency. The first microcontroller is coupled to the power supply unit, for performing modulation to the PMB according to the carrier frequency, to generate a modulated PMB. The transmission line is coupled to the power supply unit and the first microcontroller, for simultaneously transmitting the modulated PMB and the power signal. The first filter is coupled to the transmission line and the server, for filtering out the power signal from the transmission line to the server. The second filter is coupled to the transmission line and the first microcontroller, for filtering out the modulated PMB from the transmission line. The second microcontroller is coupled to the power supply unit, the first filter and the server, for performing demodulation to the modulated PMB according to the carrier frequency, to generate the PMB to the server. The first filter and the second filter are a hardware filter.

The present invention further discloses a method of transmitting a power management bus (PMB) to a server, for a power control system. The method includes outputting a power signal, a PMB and a carrier frequency; performing modulation to the PMB according to the carrier frequency, to generate a modulated PMB; by a transmission line, simultaneously transmitting the modulated PMB and the power signal; by a first filter, filtering out the power signal from the transmission line to the server; by a second filter, filtering out the modulated PMB from the transmission line; and performing demodulation to the modulated PMB according to the carrier frequency, to generate the PMB to the server; wherein the first filter and the second filter are a hardware filter.

The present invention further discloses a power control system for transmitting a power management bus (PMB) to a server. The power control system includes a power supply unit, a first microcontroller, a transmission line, a hardware filter, and a second microcontroller. The power supply unit is used for outputting a power signal, a plurality of PMB and a plurality of carrier frequency. The first microcontroller is coupled to the power supply unit, for performing modulation to the plurality of PMBs according to the plurality of carrier frequency, to generate a plurality of modulated PMBs. The transmission line is coupled to the power supply unit and the first microcontroller, for simultaneously transmitting the plurality of modulated PMB and the power signal. The hardware filter is coupled to the transmission line and the first microcontroller, for filtering out the power signal from the transmission line to the server. The second microcontroller is coupled to the power supply unit, the transmission line and the server, for filtering out the plurality of PMBs from the transmission line, and performing demodulation to the plurality of modulated PMBs according to the plurality of carrier frequency, to generate the plurality of PMBs to the server.

The present invention further discloses a method of transmitting a power management bus (PMB), for a power control system. The method includes outputting a power signal, a plurality of PMBs and a plurality of carrier frequencies; performing modulation to the plurality of PMBs according to the plurality of carrier frequency, to generate a plurality of modulated PMBs; by a transmission line, simultaneously transmitting the plurality of modulated PMBs and the power signal; by a hardware filter, filtering out the power signal from the transmission line to the server; and filtering out the plurality of PMBs from the transmission line, and performing demodulation to the plurality of modulated PMBs according to the plurality of carrier frequency, to generate the plurality of PMBs to the server.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
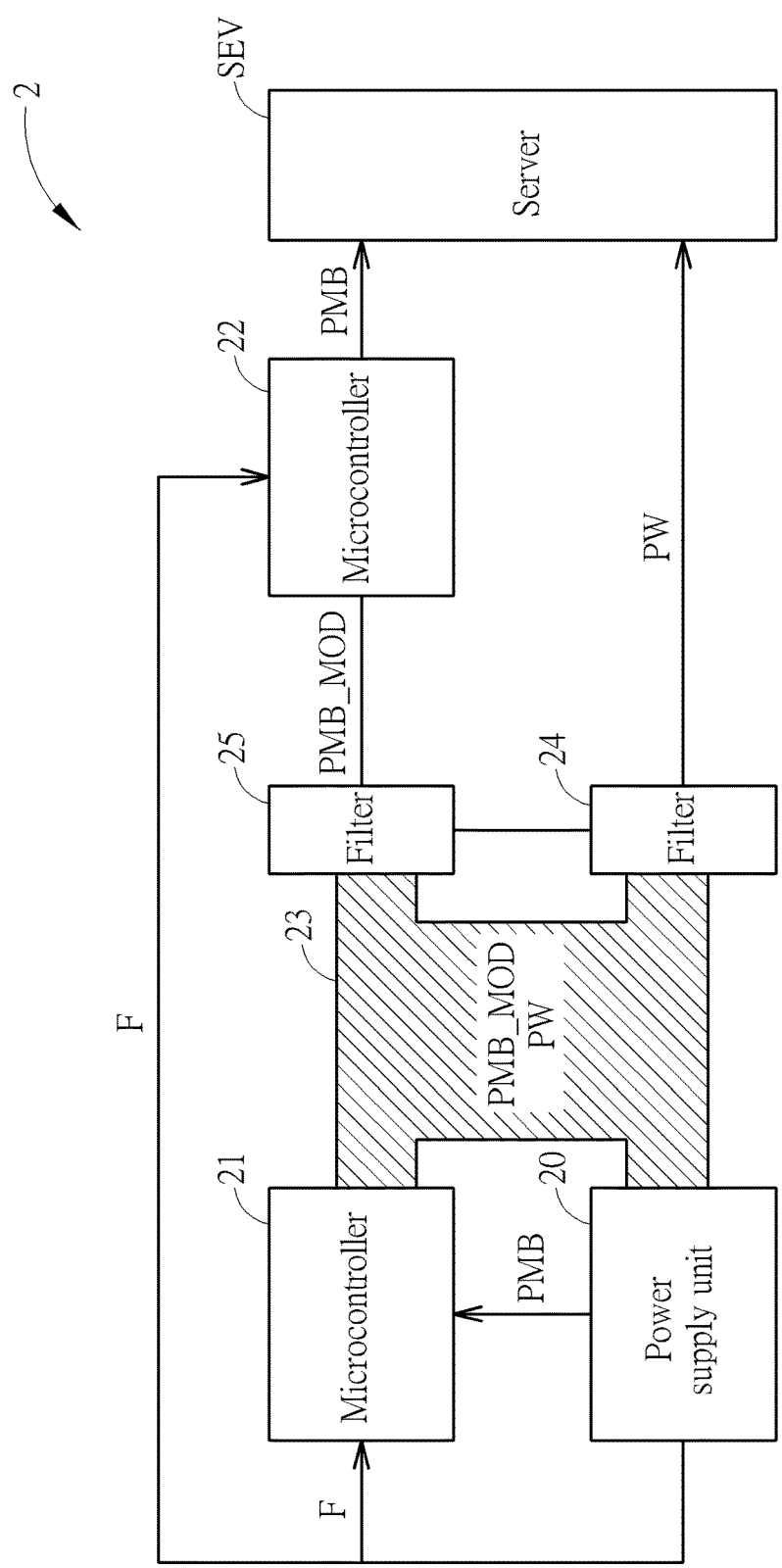
FIG. 2 is a functional block diagram of a power control system according to a first embodiment of the present invention.

FIG. 2 is a functional block diagram of a power control system 2 according to a first embodiment of the present invention. The power control system 2 supplies a power signal PW to a server SEV by a power bus (e.g., a direct-current power bus with 12 volts defined by open compute project) to drive a server SEV. The power control system 2 simultaneously provides a power management bus PMB to the server SEV, which allows the server SEV to acquire power supply information associated with the power control system 2. The power management bus PMB may be a dual-signal interface and includes a data signal and a clock signal for providing related power management information, such as supplying voltage, supplying current, temperature, fan speed, error message, and so on. The power control system 2 includes a power supply unit 20, the microcontrollers 21 and 22, a transmission line 23 and the filter 24 and 25.

Figure 1:
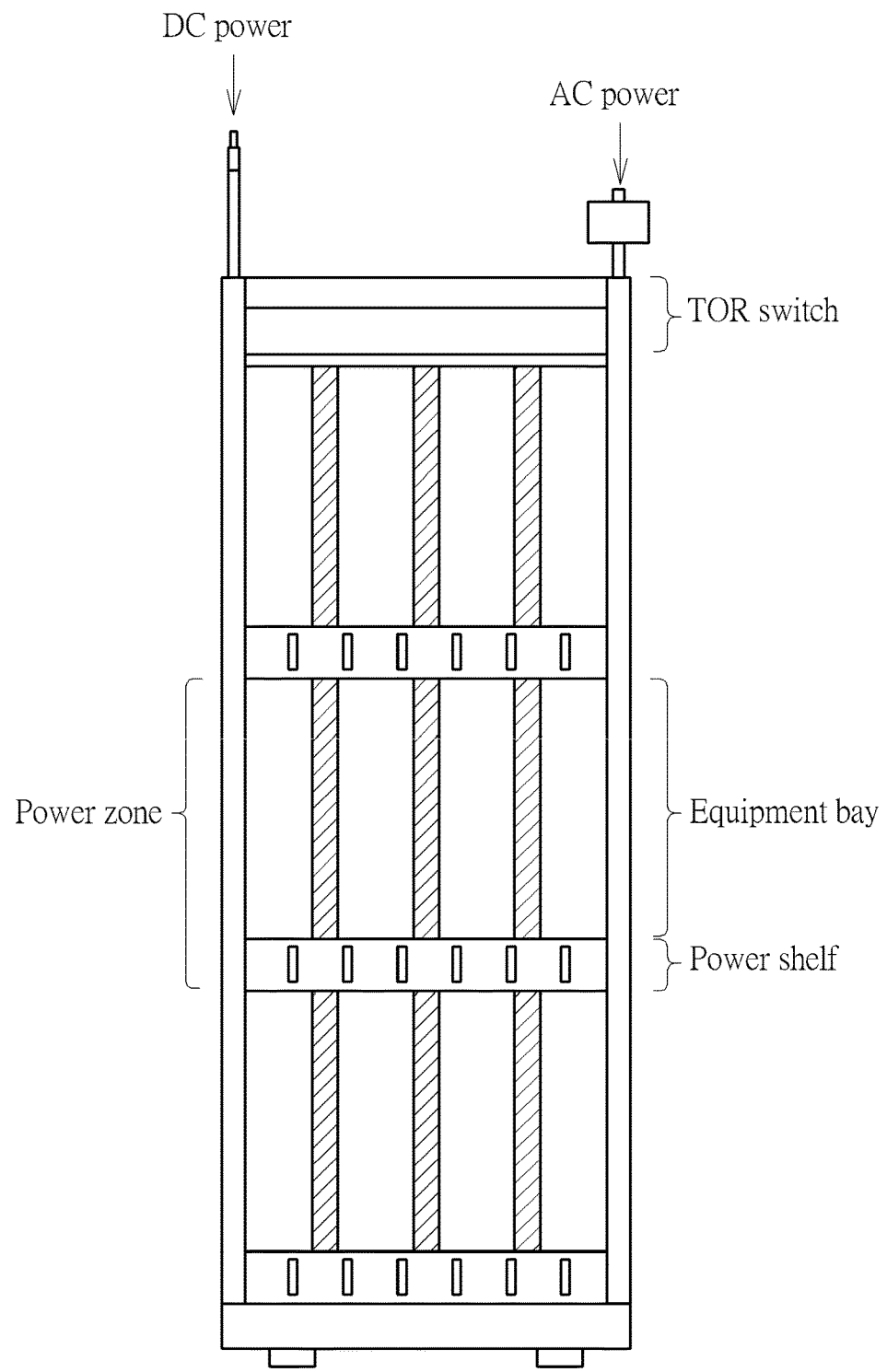
FIG. 1 illustrates a rearview of an OCP standard open rack 1.

The transmission line 23 may be the power bus bar (denoted with slash patterns in FIG. 1), for bi-directional transmission, thereby both the microcontrollers 21 and 22 are capable of performing modulation and demodulation. In other words, the microcontroller 22 operates as a receiver to perform demodulation if the microcontroller 21 operates as a transmitter to perform modulation. On the other hand, the microcontroller 21 operates as a receiver to perform demodulation if the microcontroller 22 operates as a transmitter to perform modulation. The following assumes that the microcontroller 21 operates as the transmitter the microcontroller 22 operates as the receiver.

In structure, the power supply unit 20 is coupled to the microcontroller 21 and the transmission line 23, for outputting the power signal PW to the transmission line 23, outputting the power management bus PMB to the microcontroller 21, and providing a carrier frequency F to be read by the microcontrollers 21 and 22. The microcontroller 21 is coupled to the power supply unit 20 and the transmission line 23 for performing modulation to the power management bus PMB according to carrier frequency F, to generate a modulated power management bus PMB_MOD. The transmission line 23 is coupled to the power supply unit 20, the microcontroller 21 and the filter 24 and 25, for transmitting the modulated power management bus PMB_MOD and the power signal PW. The filter 24 is coupled to the transmission line 23 and the server SEV, for filtering out the power signal PW from the transmission line 23, to transmit the power signal PW to the server SEV. The filter 25 is coupled to the transmission line 23 and the microcontroller 22 for filtering out the modulated power management bus PMB_MOD from the transmission line 23, to transmit the modulated power management bus PMB_MOD to the microcontroller 22. The microcontroller 22 is coupled to the power supply unit 20, the filter 25 and the server SEV, for performing demodulation to the modulated power management bus PMB_MOD according to the carrier frequency F, to generate the power management bus PMB to the server SEV. In one embodiment, the microcontrollers 21 and 22 detect an identification corresponding to the power supply unit 20 to read the carrier frequency F, where the identification corresponding to the power supply unit 20 is a hardware board identification of the power supply unit 20.

The power control system 2 further includes a coupler (not shown in FIG. 2), so the modulated power management bus PMB_MOD is coupled to the transmission line 23 by the coupler, such that the transmission line 23 simultaneously transmits the power signal PW and the modulated power management bus PMB_MOD. In one embodiment, the power supply unit 20 outputs the power signal PW to the microcontroller 21, and the microcontroller 21 adds the modulated power management bus PMB_MOD to the power signal PW, thereby the modulated power management bus PMB_MOD together with the power signal PW are outputted to the transmission line 23. Since the power signal PW is a direct-current signal, and the modulated power management bus PMB_MOD are alternative-current signals with the carrier frequency F, the modulated power management bus PMB_MOD and the power signal PW can be simultaneously transmitted in one physical transmission line without interfering with each other.

In operation, once the power management bus PMB is received by the microcontroller 21, the microcontroller 21 reads the carrier frequency F from the power supply unit 20 to perform modulation to the power management bus PMB according to carrier frequency F, so as to generate the modulated power management bus PMB_MOD. The microcontroller 21 adds the modulated power management bus PMB_MOD to the power signal PW by the coupler, thereby the transmission line simultaneously transmits the modulated power management bus PMB_MOD and the power signal PW. The filter 24 filters out the power signal PW from the transmission line 23 to provide power with pure direct-current to the server SEV. The filter 25 filters out the modulated power management bus PMB_MOD from the transmission line 23 to provide pure alternative-current signals to the microcontroller 22. The microcontroller 22 performs demodulation to the modulated power management bus PMB_MOD according to carrier frequency F, so as to output the power management bus PMB to the server SEV.

For example, assume that the carrier frequency of the power management bus PMB is read according to an identification 0XB0 of a power supply unit, and the power management bus PMB includes a data signal PMB_DATA and a clock signal PMB_CLK, where the data signal PMB_DATA has a carrier frequency F_DATA and the clock signal PMB_CLK has a carrier frequency F_CLK to be 500 KHz and 600 KHz (nKHz, nKHz+100 KHz). In other embodiments, the carrier frequencies F_DATA and F_CLK are distinct and arbitrary. The microcontroller 21 respectively performs modulation to the data signal PMB_DATA and the clock signal PMB_CLK according to the carrier frequencies 500 KHz and 600 KHz, to generate the modulated power management bus PMB_MOD. Once the modulated power management bus PMB_MOD is received by the filter 25, the filter 25 (e.g., a band pass filter) filters out signals with the carrier frequencies 500 KHz and 600 KHz from the carrier frequency F_DATA, to transmit the data signal PMB_DATA and the clock signal PMB_CLK to the microcontroller 22. Once the modulated power management bus PMB_MOD is received by the microcontroller 22, the microcontroller reads the carrier frequency by detecting the identification corresponding to the power supply unit (e.g., determine the carrier frequencies 500 KHz and 600 KHz by a phase lock loop circuit, and read that the power supply unit to be 0XB0). Then, the microcontroller 22 respectively performs signal filtering and demodulation to the data signal PMB_DATA and the clock signal PMB_CLK of the power management bus PMB according to the carrier frequency 500 KHz and 600 KHz, thereby recovers the power management bus PMB and outputs the power management bus PMB to the server SEV.

As a result, by integrating the modulated power management bus PMB_MOD with the power signal PW to the single transmission line 23, the power control system 2 can save cost for power management circuit and wire configuration for processing and transmitting the power management bus PMB. Further, since the transmission line 23 is connected to all the power zones, power information associated with the power supply unit 20 can be broadcast to all the power zones by the transmission line 23, which is benefit for error discovery and notification to reduce hardware hazards.

Figure 3:
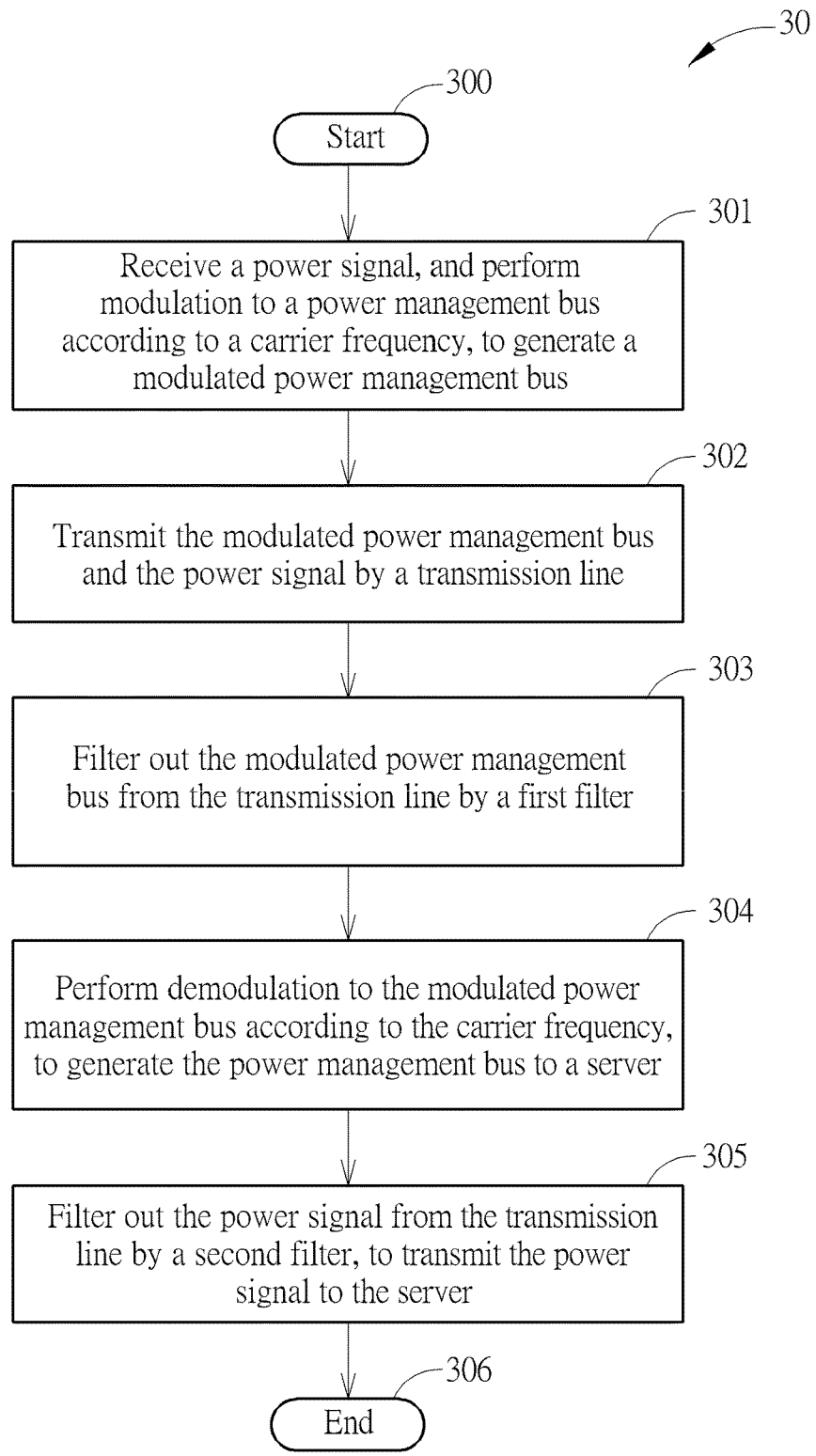
FIG. 3 is a flowchart of a process according to an embodiment of the present invention.

Operation of the power control system 2 can be summarized into a process 30 for transmitting power management bus, as shown in FIG. 3. The process 30 is used for simultaneously transmitting power signal and power management bus by a transmission line, and includes the following steps:

Step 300: Start.
Step 301: Receive a power signal, and perform modulation to a power management bus according to a carrier frequency, to generate a modulated power management bus.
Step 302: Transmit the modulated power management bus and the power signal by a transmission line.
Step 303: Filter out the modulated power management bus from the transmission line by a first filter.
Step 304: Perform demodulation to the modulated power management bus according to the carrier frequency, to generate the power management bus to a server.
Step 305: Filter out the power signal from the transmission line by a second filter, to transmit the power signal to the server.
Step 306: End.

In the process 30, Step 301 is performed by the microcontroller 21 (i.e., the transmitter), Step 302 is performed by the transmission line 23, Step 303 is performed by the filter 25, Step 304 is performed by the microcontroller 22 (i.e., the receiver), and Step 305 is performed by the filter 24. Detailed descriptions regarding the process 30 can be obtained by referring to operations of the embodiment in FIG. 2, which is omitted.

Figure 4:
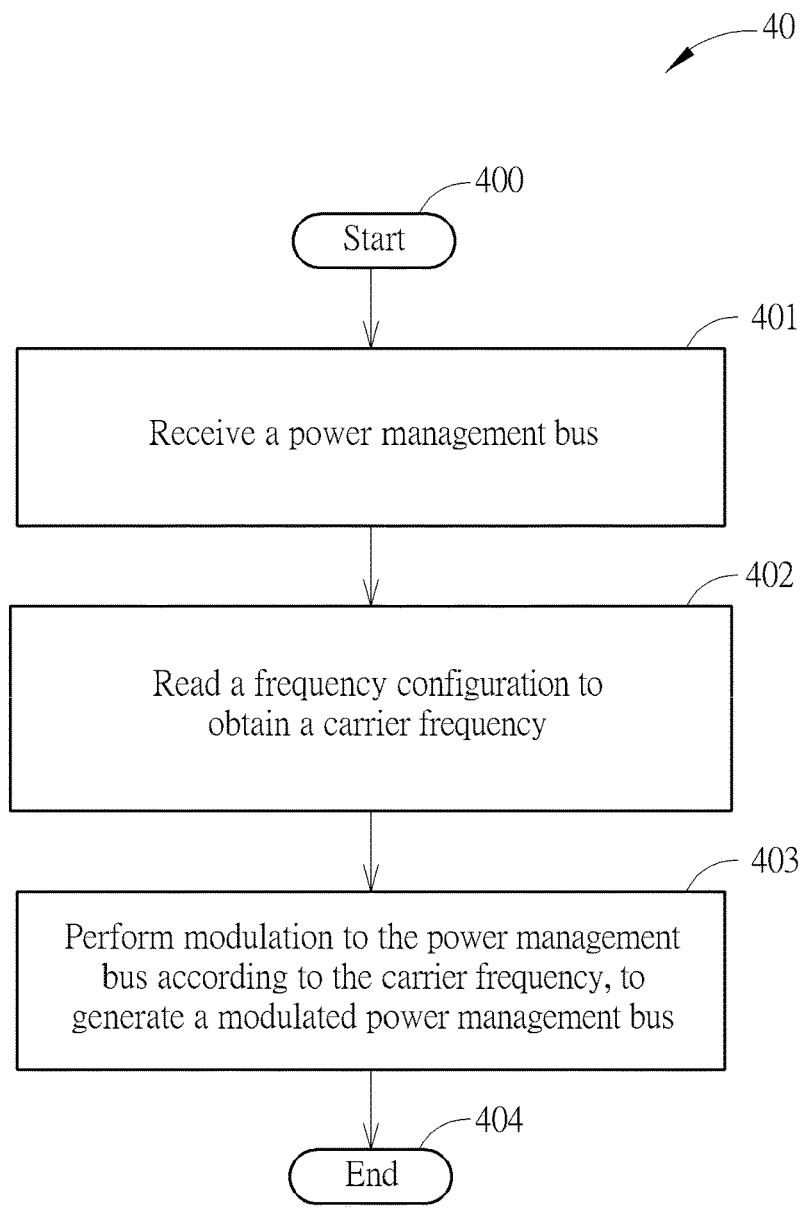
FIG. 4 is a flowchart of a modulation process according to an embodiment of the present invention.

FIG. 4 is a flowchart of a modulation process 40 according to an embodiment of the present invention. The process 40 is utilized in the transmitter for performing modulation to the power management bus PMB, so as to generate the modulated power management bus PMB_MOD. The process 40 includes the following steps:

Step 400: Start.
Step 401: Receive a power management bus.
Step 402: Read a frequency configuration to obtain a carrier frequency.
Step 403: Perform modulation to the power management bus according to the carrier frequency, to generate a modulated power management bus.
Step 404: End.

Detailed descriptions regarding the process 40 can be obtained by referring to operations of the embodiment in FIG. 2, which is omitted. Note that in Step 402, the frequency configuration is indicated by an identification corresponding to the power supply unit 20 or an identification corresponding to a hardware circuit of the power supply unit 20, thereby the transmitter can read the carrier frequency. In Step 403, the microcontroller 21 utilizes a PLL circuit to tune the carrier frequency to a desired value, and then performs modulation to the power management bus according to phase-shift-keying (FSK) modulation, so as to generate the modulated power management bus.

Figure 5:
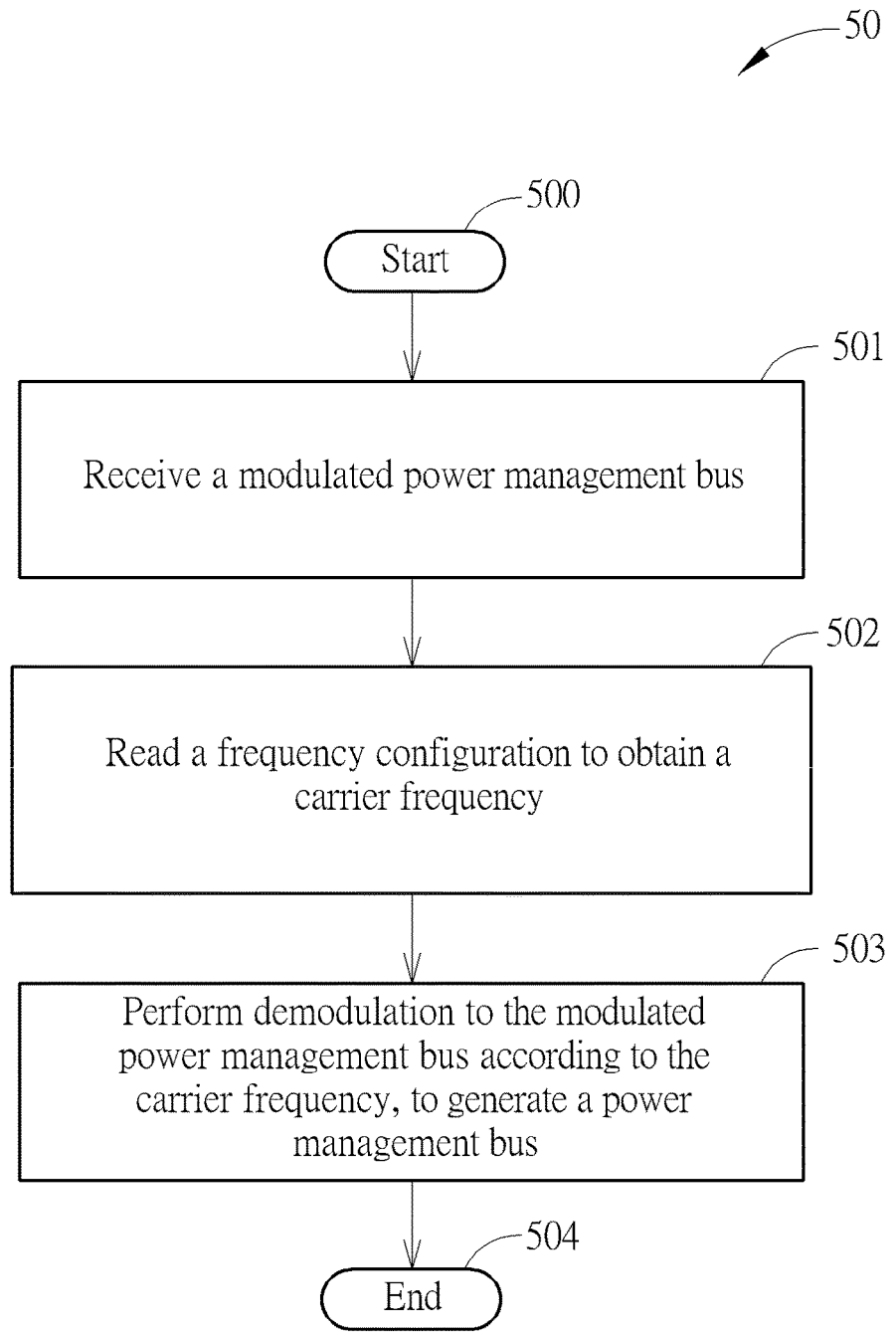
FIG. 5 is a flowchart of a demodulation process 50 according to an embodiment of the present invention.

FIG. 5 is a flowchart of a demodulation process 50 according to an embodiment of the present invention. The process 50 is utilized in the receiver for performing demodulation to the modulated power management bus PMB_MOD, so as to generate the power management bus PMB to the server SEV. The process 50 includes the following steps:

Step 500: Start.
Step 501: Receive a modulated power management bus.
Step 502: Read a frequency configuration to obtain a carrier frequency.
Step 503: Perform demodulation to the modulated power management bus according to the carrier frequency, to generate a power management bus.
Step 504: End.

Detailed descriptions regarding the process 50 can be obtained by referring to operations of the embodiment in FIG. 2, which is omitted. Note that in Step 503, the microcontroller 22 utilizes a PLL circuit to detect phases of the modulated power management bus, and then performs demodulation to the modulated power management bus according to FSK demodulation, so as to recover the power management bus.

In short, the present invention simultaneously transmits the modulated power management bus PMB_MOD (i.e. the power management bus PMB after demodulation) and the power signal PW by the transmission line 23, and respectively filters out the power signal PW and the modulated power management bus PMB_MOD from the transmission line 23 by the filters 24 and 25, and finally performs demodulation to recover the power management bus PMB and provides power by power signal PW. As a result, additional power management circuit and related wire configurations are avoided from the power control system 2, which saves cost of the power control system 2. Moreover, since the transmission line 23 is connected to all the power zones, power information associated with the power supply unit 20 can be broadcast to all the power zones by the transmission line 23, which is benefit for error discovery and notification to reduce hardware hazards.

Those skilled in the art may make modifications and alterations according to the abovementioned embodiments, which is not limited. For example, circuit structures of the power control system 2 are not limited, the microcontroller 21 can be integrated in the power supply unit 20. In one embodiment, the microcontroller 22 and the filter 24 and 25 can be integrated in the server SEV.

In one embodiment, the power supply unit 20 can be a field-replaceable unit (FRU), so the microcontrollers 21 and 22 cane detect an identification of the field-replaceable unit to read the carrier frequency F corresponding to the field-replaceable unit. Therefore, the microcontrollers 21 and 22 utilizes different carrier frequencies corresponding to different field-replaceable units with various hardware configurations and operating requirements, to perform modulation and demodulation to the power management bus PMB. The identification of the field-replaceable unit can be burned or written in its built-in electrically-erasable programmable read-only memory (EEPROM).

Figure 6:
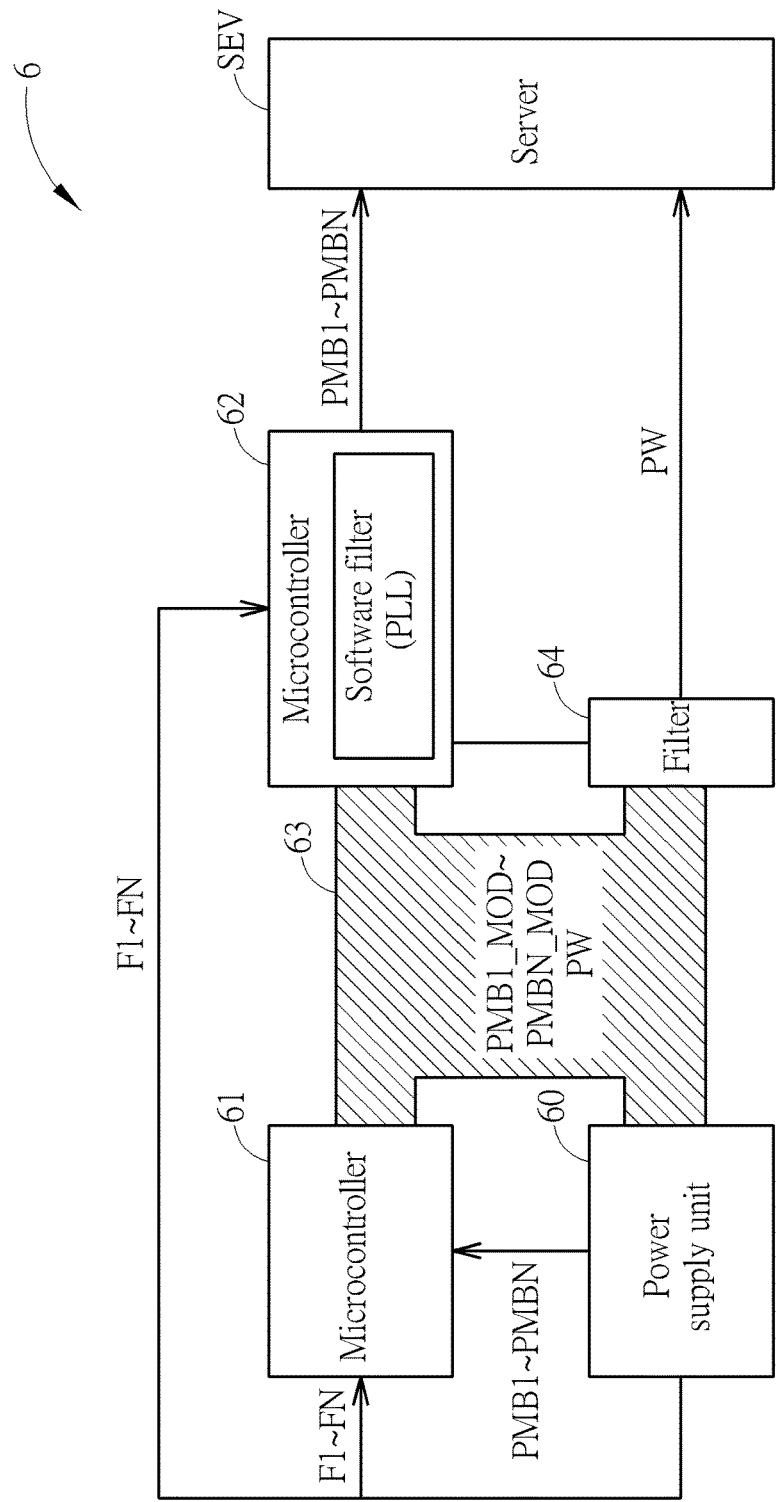
FIG. 6 is a functional block diagram of a power control system according to a first embodiment of the present invention.

FIG. 6 is a functional block diagram of a power control system 6 according to a second embodiment of the present invention. The power control system 6 includes a power supply unit 60, microcontrollers 61 and 62, a transmission line 63 and a filter 64. The power control system 6 provides a plurality of power management buses PMB1~PMBN to the server SEV, where the plurality of power management buses PMB1~PMBN can be transmitted to one server or transmitted to different servers or any hardware equipment that required power management by different signal paths. Note that in the first embodiment of FIG. 2, signal filtering to the power management bus is realized by a hardware filter, while in the second embodiment of FIG. 6, the microcontroller 62 further performs signal processing to the power management buses PMB1~PMBN to realize signal filtering by a software filter. The following assumes that the microcontroller 61 operates as the transmitter the microcontroller 62 operates as the receiver.

The power supply unit 60 is coupled to microcontroller 61 and transmission line 63, for outputting the power signal PW to the transmission line 63 and outputting the power management buses PMB1~PMBN to the microcontroller 61. The microcontroller 61 is coupled to the transmission line 63, for performing modulation to the power management buses PMB1~PMBN according to carrier frequencies F1~FN, to generate modulated power management buses PMB1_MOD~PMBN_MOD. Transmission line 63 is coupled to the power supply unit 60, the microcontroller 61 and filter 64, for simultaneously transmitting the modulated power management buses PMB1_MOD~PMBN_MOD and the power signal PW. The filter 64 is coupled to the transmission line 63 and the server SEV, for filtering out the power signal PW from the transmission line 63, to transmit the power signal PW to the server SEV. The microcontroller 62 is coupled to the transmission line 63 and the server SEV, for filtering out the modulated power management buses PMB1_MOD~PMBN_MOD from the transmission line 63 by software filtering, and performing demodulation to the modulated power management buses PMB1_MOD~PMBN_MOD according to carrier frequencies F1~FN, to generate the power management buses PMB1~PMBN to the server SEV. The microcontrollers 61 and 62 reads the carrier frequencies F1~FN from the power supply unit 60, detects an identification corresponding to the power supply unit 60, to read the carrier frequencies F1~FN, where the identification corresponding to the power supply unit 60 can be a hardware board identification of the power supply unit 60. In one embodiment, the power management buses PMB1~PMBN and the carrier frequencies F1~FN can be provided by or read from different power supply units.

Since the power signal PW is a direct-current signal, and the modulated power management buses PMB1_MOD~PMBN_MOD are alternative-current signals with the carrier frequencies F1~FN, the modulated power management buses PMB1_MOD~PMBN_MOD and the power signal PW can be simultaneously transmitted in one physical transmission line without interfering with each other.

In operation, once the power management buses PMB1~PMBN are received by the microcontroller 61, the microcontroller 61 reads the carrier frequencies F1~FN from the power supply unit 60 to perform modulation to the power management bus PMB according to carrier frequencies F1~FN, so as to generate the modulated power management buses PMB1_MOD~PMBN_MOD. The microcontroller 61 adds the modulated power management buses PMB1_MOD~PMBN_MOD to the power signal PW, thereby the transmission line 63 simultaneously transmits the modulated power management buses PMB1_MOD~PMBN_MOD and the power signal PW. The filter 64 filters out the power signal PW from the transmission line 63 to provide power with pure direct-current to the server SEV. The microcontroller 62 filters out the modulated power management buses PMB1_MOD~PMBN_MOD from the transmission line 63, and then performs demodulation to the modulated power management buses PMB1_MOD~PMBN_MOD according to carrier frequencies F1~FN, so as to generate the power management buses PMB1~PMBN. The power management buses PMB1~PMBN can be transmitted to one server or transmitted to different servers or any hardware equipment that required power management by different signal paths.

For example, assume that the carrier frequency of the power management bus PMB1 is read according to an identification 0XB0 of a power supply unit, and the power management bus PMB includes a data signal PMB1_DATA with a carrier frequency 500 KHz and a clock signal PMB1_CLK with a carrier frequency 600 KHz. The microcontroller 61 performs modulation to the data signal PMB1_DATA and the clock signal PMB1_CLK included in the power management bus PMB1 according to the carrier frequencies 500 KHz and 600 KHz, so as to generate the modulated power management bus PMB1_MOD. Once the modulated power management bus PMB1_MOD is received by the microcontroller 62, the microcontroller 62 reads the carrier frequency by detecting an identification corresponding to the power supply unit (e.g., determine the carrier frequencies 500 KHz and 600 KHz by a phase lock loop circuit to realize software filtering, and read that the power supply unit to be 0XB0). Then, the microcontroller 22 respectively performs signal filtering and demodulation to the data signal PMB1_DATA and the clock signal PMB1_CLK of the power management bus PMB1 according to the carrier frequency 500 KHz and 600 KHz, thereby recovers the power management bus PMB1 and outputs the power management bus PMB1 to the server SEV. And so forth, the microcontrollers 61 and 62 read the carrier frequencies F2~FN according to the identifications corresponding to the power supply units for of the power management buses PMB 2~PMBN, thereby perform signal modulation and demodulation, and the microcontroller 62 recovers the data signals PMB2_DATA~PMBN_DATA and the clock signals PMB2_CLK~PMBN_CLK of the power management bus PMB 2~PMBN. Finally, the microcontroller 62 respectively transmits the power management bus PMB1~PMBN to destined signal paths.

Compare with the power control system 2, the power control system 6 further integrates a plurality of modulated power management buses PMB1_MOD~PMBN_MOD and the power signal PW in single transmission line (i.e., the transmission line 63), so the power control system 6 can save more cost regarding wire configurations for transmitting the power management buses PMB1~PMBN. Further, since the transmission line 63 is connected to all the power zones, the power management buses PMB1~PMBN can be broadcast to all the power zones by the transmission line 63, which is benefit for error discovery and notification to reduce hardware hazards.

Figure 7:
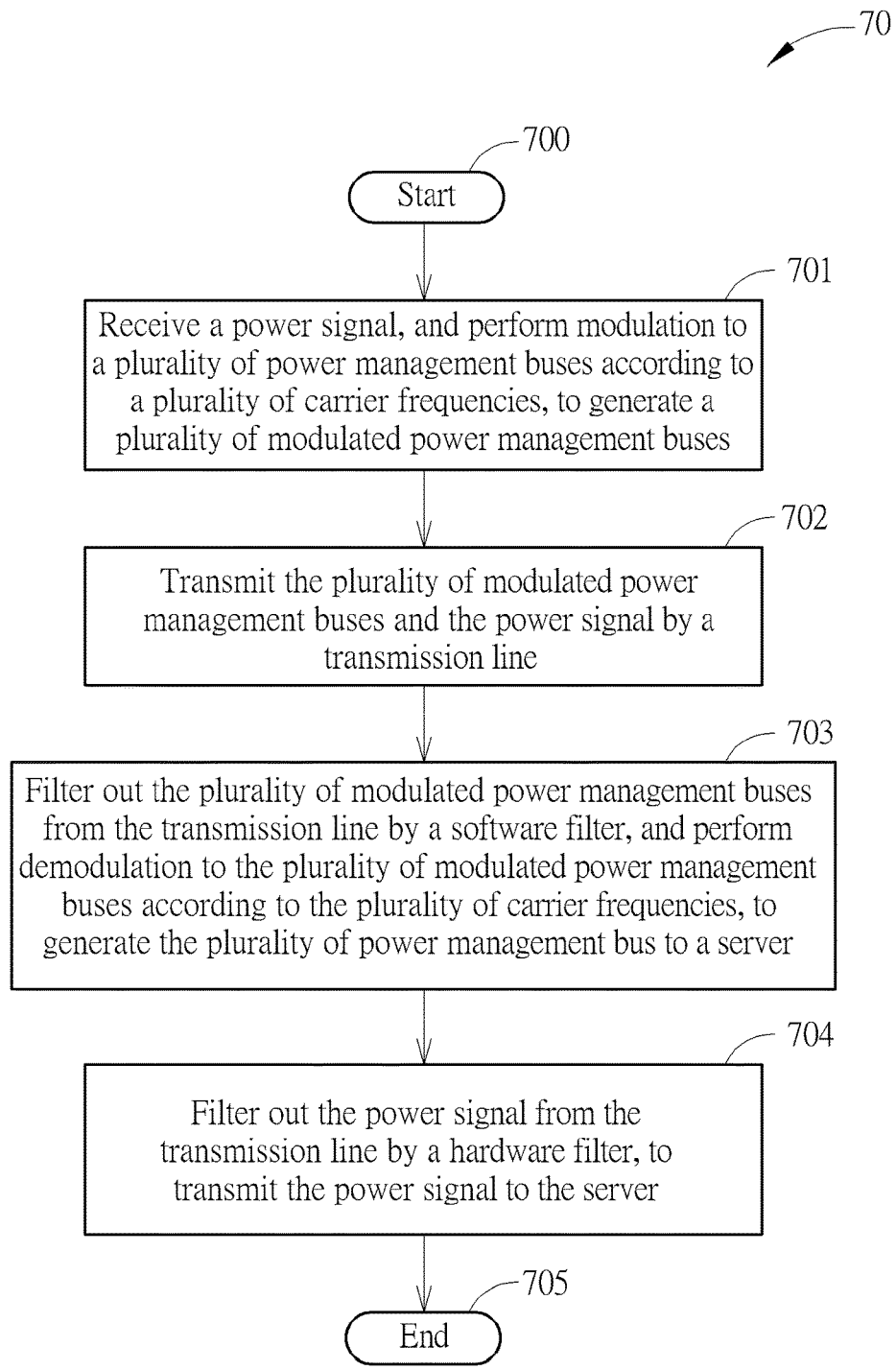
FIG. 7 is a flowchart of a process according to an embodiment of the present invention.

Operation of the power control system 7 can be summarized into a process 70 for transmitting power management bus, as shown in FIG. 7. The process 70 is used for simultaneously transmitting power signal and a plurality of power management buses by a transmission line, and includes the following steps:

Step 700: Start.
Step 701: Receive a power signal, and perform modulation to a plurality of power management buses according to a plurality of carrier frequencies, to generate a plurality of modulated power management buses.
Step 702: Transmit the plurality of modulated power management buses and the power signal by a transmission line.
Step 703: Filter out the plurality of modulated power management buses from the transmission line by a software filter, and perform demodulation to the plurality of modulated power management buses according to the plurality of carrier frequencies, to generate the plurality of power management bus to a server.
Step 704: Filter out the power signal from the transmission line by a hardware filter, to transmit the power signal to the server.
Step 705: End.

In the process 70, Step 701 is performed by the microcontroller 61 (i.e., the transmitter), Step 702 is performed by the transmission line 63, Step 703 is performed by the microcontroller 62 (i.e., the receiver), and Step 704 is performed by the filter 64. Detailed descriptions regarding the process 70 can be obtained by referring to operations of the embodiment in FIG. 6, which is omitted.

Figure 8:
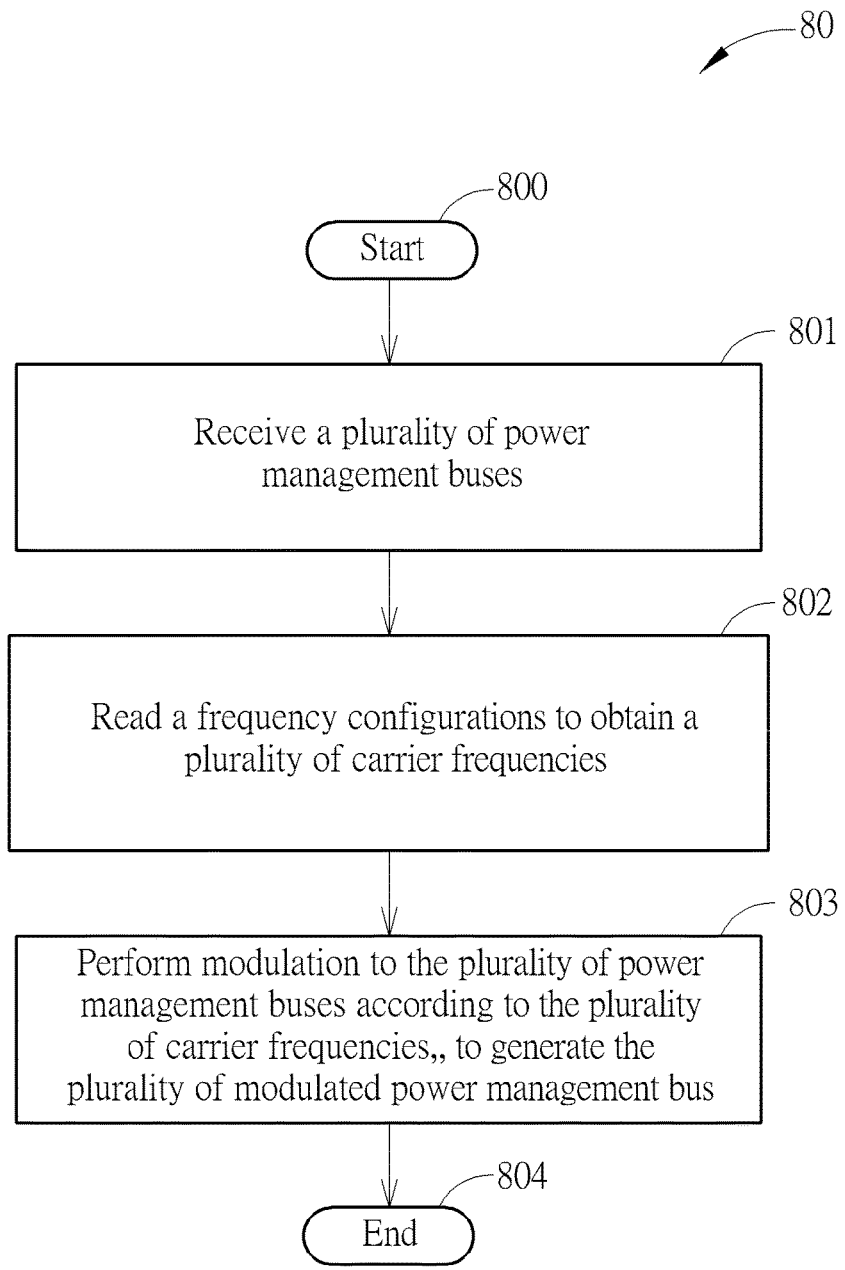
FIG. 8 is a flowchart of a modulation process according to an embodiment of the present invention.

FIG. 8 is a flowchart of a modulation process 80 according to an embodiment of the present invention. The process 80 is utilized in the transmitter for performing modulation to the power management buses PMB1~PMBN, so as to generate the modulated power management buses PMB1_MOD~PMBN_MOD. The process 80 includes the following steps:

Step 800: Start.
Step 801: Receive a plurality of power management buses.
Step 802: Read a frequency configurations to obtain a plurality of carrier frequencies.
Step 803: Perform modulation to the plurality of power management buses according to the plurality of carrier frequencies, to generate the plurality of modulated power management bus.
Step 808: End.

Detailed descriptions regarding the process 80 can be obtained by referring to operations of the embodiment in FIG. 6, which is omitted. Note that in Step 802, the frequency configurations are indicated by an identification corresponding to the power supply unit 60 or an identification corresponding to a hardware circuit of the power supply unit 60, thereby the transmitter can read the carrier frequencies. In Step 803, the microcontroller 61 utilizes a PLL circuit to tune the carrier frequencies to desired values, and then performs modulation to the plurality of power management buses according to FSK modulation, so as to generate the plurality of modulated power management buses.

Figure 9:
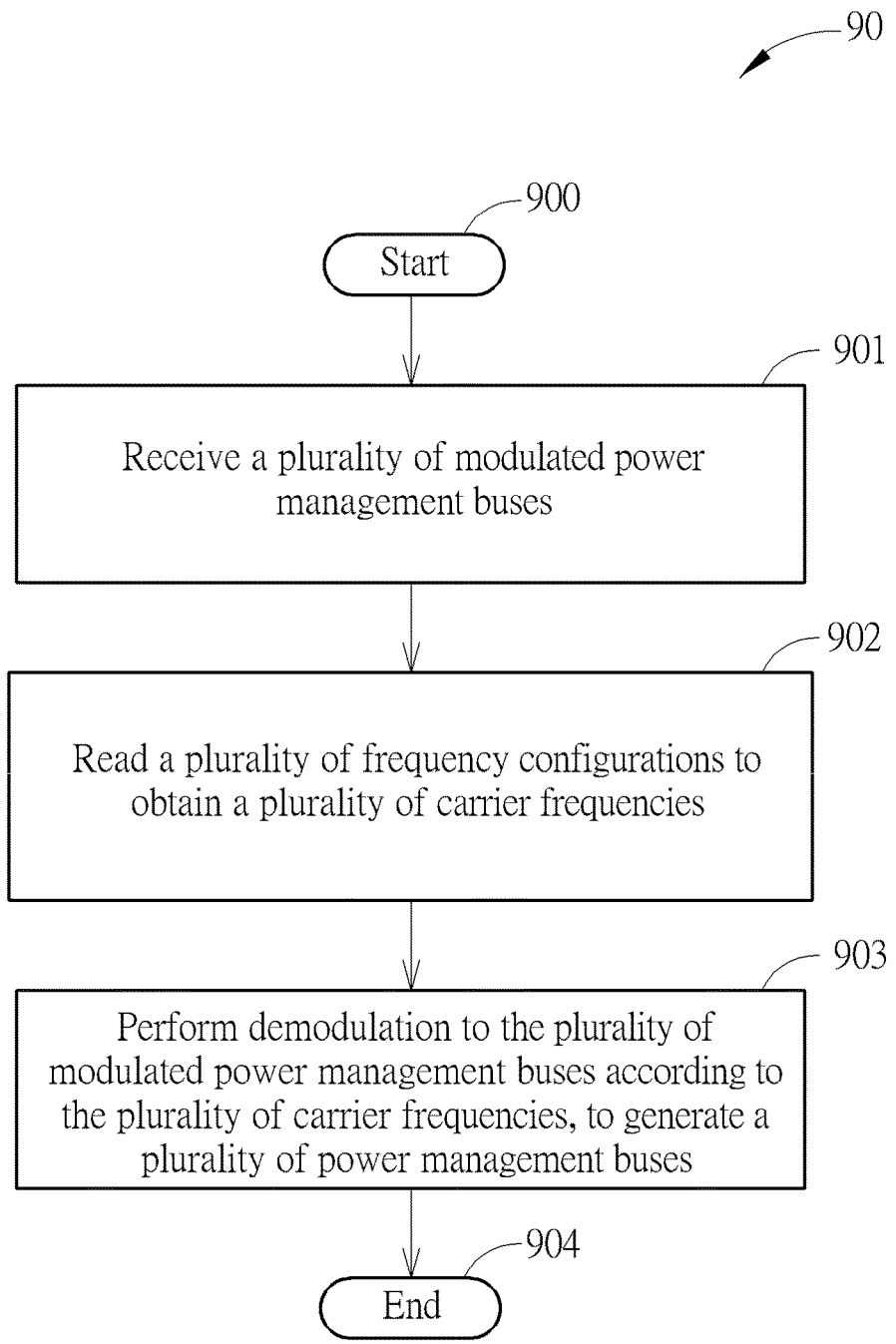
FIG. 9 is a flowchart of a demodulation process according to an embodiment of the present invention.

FIG. 9 is a flowchart of a demodulation process 90 according to an embodiment of the present invention. The process 90 is utilized in the receiver for performing demodulation to the modulated power management buses PMB1_MOD~PMBN_MOD, so as to generate the power management buses PMB1~PMBN to the server SEV. The process 90 includes the following steps:

Step 900: Start.
Step 901: Receive a plurality of modulated power management buses.
Step 902: Read a plurality of frequency configurations to obtain a plurality of carrier frequencies.
Step 903: Perform demodulation to the plurality of modulated power management buses according to the plurality of carrier frequencies, to generate a plurality of power management buses.
Step 904: End.

Detailed descriptions regarding the process 90 can be obtained by referring to operations of the embodiment in FIG. 6, which is omitted. Note that in Step 903, the microcontroller 62 utilizes a PLL circuit to detect phases of the plurality of modulated power management buses, and then performs demodulation to the plurality of modulated power management buses according to FSK demodulation, so as to recover the plurality of power management buses.

To sum up, the present invention simultaneously transmits the modulated power management bus (i.e. the power management bus after demodulation) and the power signal by the transmission line, filters out the power signal from the transmission line by a hardware filter for power supply, and filters the modulated power management bus from the transmission line by a software or hardware filter, and finally performs demodulation to recover the power management bus. As a result, additional power management circuit and related wire configurations are avoided from the power control system, which saves cost of the power control system. Further, since the transmission line is connected to all the power zones, the power management bus can be broadcast to all the power zones by the transmission line, which is benefit for error discovery and notification to reduce hardware hazards.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A power control system for transmitting a power management bus (PMB) to a server, comprises:
   a power supply unit for outputting a power signal, a PMB and a carrier frequency;
   a first microcontroller coupled to the power supply unit, for performing modulation to the PMB according to the carrier frequency, to generate a modulated PMB;
   a transmission line coupled to the power supply unit and the first microcontroller, for simultaneously transmitting the modulated PMB and the power signal;
   a first filter coupled to the transmission line and the server, for filtering out the power signal from the transmission line to the server;
   a second filter coupled to the transmission line and the first microcontroller, for filtering out the modulated PMB from the transmission line; and
   a second microcontroller coupled to the power supply unit, the first filter and the server, for performing demodulation to the modulated PMB according to the carrier frequency, to generate the PMB to the server;
   wherein the first filter and the second filter are a hardware filter.

2. The power control system of claim 1, wherein the transmission line is a direct-current power bus with 12 volt defined by open compute project (OCP).

3. The power control system of claim 1, wherein the PMB comprises a data signal and a clock signal, and the carrier frequency comprises a first component frequency and a second component frequency, wherein the first component frequency is denoted as nKHz and the second component frequency is denoted as nKHz+100 KHz, where n is an integer.

4. The power control system of claim 3, wherein the first microcontroller respectively performs modulation to the data signal and the clock signal according to the first component frequency and the second component frequency, to generate the modulated PMB; and the second microcontroller respectively performs demodulation to the modulated PMB according to the first component frequency and the second component frequency, to recover the PMB.

5. The power control system of claim 1, wherein the first and second microcontrollers detect an identification corresponding to the power supply unit to read the carrier frequency.

6. The power control system of claim 5, wherein the identification corresponding to the power supply unit is a hardware board identification.

7. The power control system of claim 5, wherein the power supply unit is a field-replaceable unit (FRU), and the identification corresponding to the power supply unit is burned in an Electrically-Erasable Programmable Read-Only Memory (EEPROM) of the power supply unit.

8. A method of transmitting a power management bus (PMB) to a server, for a power control system, comprises:
   outputting a power signal, a PMB and a carrier frequency;
   performing modulation to the PMB according to the carrier frequency, to generate a modulated PMB;
   by a transmission line, simultaneously transmitting the modulated PMB and the power signal;
   by a first filter, filtering out the power signal from the transmission line to the server;
   by a second filter, filtering out the modulated PMB from the transmission line; and
   performing demodulation to the modulated PMB according to the carrier frequency, to generate the PMB to the server;
   wherein the first filter and the second filter are a hardware filter.

9. The method of claim 8, wherein the transmission line is a direct-current power bus with 12 volt defined by open compute project (OCP).

10. The method of claim 8, wherein the PMB comprises a data signal and a clock signal, and the carrier frequency comprises a first component frequency and a second component frequency, wherein the first component frequency is denoted as nKHz and the second component frequency is denoted as nKHz+100 KHz, where n is an integer.

11. The method of claim 10, wherein performing modulation to the PMB according to the carrier frequency, to generate a modulated PMB comprises:
   respectively performs modulation to the data signal and the clock signal according to the first component frequency and the second component frequency, to generate the modulated PMB.

12. The method of claim 10, wherein performing demodulation to the modulated PMB according to the carrier frequency, to generate the PMB to the server comprises:
   respectively performs demodulation to the modulated PMB according to the first component frequency and the second component frequency, to recover the PMB.

13. The method of claim 8, wherein the power control system comprises a power supply unit, and the method further comprises:
   detecting an identification corresponding to the power supply unit to read the carrier frequency.

14. The method of claim 13, wherein the identification corresponding to the power supply unit is a hardware board identification.

15. The method of claim 13, wherein the power supply unit is a field-replaceable unit (FRU), and the identification corresponding to the power supply unit is burned in an Electrically-Erasable Programmable Read-Only Memory (EEPROM) of the power supply unit.

16. A power control system for transmitting a power management bus (PMB) to a server, comprises:
   a power supply unit for outputting a power signal, a plurality of PMBs and a plurality of carrier frequencies;
   a first microcontroller coupled to the power supply unit, for performing modulation to the plurality of PMBs according to the plurality of carrier frequencies, to generate a plurality of modulated PMBs;
   a transmission line coupled to the power supply unit and the first microcontroller, for simultaneously transmitting the plurality of modulated PMBs and the power signal;
   a hardware filter coupled to the transmission line and the first microcontroller, for filtering out the plurality of modulated PMBs from the transmission line to the server; and
   a second microcontroller coupled to the power supply unit, the transmission line and the server, for filtering out the power signal from the transmission line, and performing demodulation to the plurality of modulated PMBs according to the plurality of carrier frequencies, to generate the plurality of PMBs to the server.

17. The method of claim 16, wherein the transmission line is a direct-current power bus with 12 volt defined by open compute project (OCP).

18. The method of claim 16, wherein the PMB comprises a data signal and a clock signal, and the carrier frequency comprises a first component frequency and a second component frequency, wherein the first component frequency is denoted as nKHz and the second component frequency is denoted as nKHz+100 KHz, where n is an integer.

19. The method of claim 18, wherein the first microcontroller respectively performs modulation to the data signal and the clock signal according to the first component frequency and the second component frequency, to generate one of the plurality of modulated PMBs; and the second microcontroller filters out the power signal from the transmission line by a phase lock loop (PLL) circuit, and respectively performs demodulation to one of the plurality of modulated PMBs according to the first component frequency and the second component frequency, to recover one of the plurality of PMBs.

20. The method of claim 16, wherein the first and second microcontrollers detect an identification corresponding to the power supply unit to read the carrier frequency.

21. The method of claim 20, wherein the identification corresponding to the power supply unit is a hardware board identification.

22. The method of claim 20, wherein the power supply unit is a field-replaceable unit (FRU), and the identification corresponding to the power supply unit is burned in an Electrically-Erasable Programmable Read-Only Memory (EEPROM) of the power supply unit.

23. A method of transmitting a power management bus (PMB), for a power control system, comprises:
   outputting a power signal, a plurality of PMBs and a plurality of carrier frequencies;
   performing modulation to the plurality of PMBs according to the plurality of carrier frequencies, to generate a plurality of modulated PMBs;
   by a transmission line, simultaneously transmitting the plurality of modulated PMBs and the power signal;
   by a hardware filter, filtering out the plurality of modulated PMBs from the transmission line to the server; and
   filtering out the power signal from the transmission line, and performing demodulation to the plurality of modulated PMBs according to the plurality of carrier frequencies, to generate the plurality of PMBs to the server.

24. The method of claim 23, wherein the transmission line is a direct-current power bus with 12 volt defined by open compute project (OCP).

25. The method of claim 23, wherein the PMB comprises a data signal and a clock signal, and the carrier frequency comprises a first component frequency and a second component frequency, wherein the first component frequency is denoted as nKHz and the second component frequency is denoted as nKHz+100 KHz, where n is an integer.

26. The method of claim 25, wherein performing modulation to the plurality of PMBs according to the plurality of carrier frequencies, to generate the plurality of modulated PMBs comprises:
   respectively performs modulation to the data signal and the clock signal according to the first component frequency and the second component frequency, to generate one of the plurality of modulated PMBs.

27. The method of claim 25, wherein filtering out the power signal from the transmission line, and performing demodulation to the plurality of modulated PMBs according to the plurality of carrier frequencies, to generate the plurality of PMBs to the server comprises:
   filtering out the power signal from the transmission line by a phase lock loop (PLL) circuit; and
   respectively performing demodulation to one of the plurality of modulated PMBs according to the first component frequency and the second component frequency, to recover one of the plurality of PMBs.

28. The method of claim 23, wherein the first and second microcontrollers detect an identification corresponding to the power supply unit to read the carrier frequency.

29. The method of claim 28, wherein the identification corresponding to the power supply unit is a hardware board identification.

30. The method of claim 28, wherein the power supply unit is a field-replaceable unit (FRU), and the identification corresponding to the power supply unit is burned in an Electrically-Erasable Programmable Read-Only Memory (EEPROM) of the power supply unit.

* * * * *